(12) United States Patent
King et al.

(10) Patent No.: US 6,477,707 B1
(45) Date of Patent: Nov. 5, 2002

(54) METHOD AND SYSTEM FOR BROADCAST TRANSMISSION OF MEDIA OBJECTS

(75) Inventors: Martin Cranston King, Zug (CH); Erik Troelsen, Viganello (CH); Enrico Gulfi, Caslano (CH)

(73) Assignee: Fantastic Corporation, Zug (CH)

( * ) Notice: Subject to any disclaimer, the term of this patent is extended or adjusted under 35 U.S.C. 154(b) by 0 days.

(21) Appl. No.: 09/046,901

(22) Filed: Mar. 24, 1998

(51) Int. Cl.[7] .......................... H04N 7/173; H04N 7/16
(52) U.S. Cl. .......................... 725/97; 725/117; 725/91; 725/103; 725/114; 725/115; 725/143; 725/144; 725/145; 725/147
(58) Field of Search .......................... 725/90, 91, 93, 725/97, 98, 114, 116, 118, 138, 144, 148, 145, 32, 58, 103, 117, 143, 146, 147; 345/723

(56) References Cited

U.S. PATENT DOCUMENTS

| | | | | |
|---|---|---|---|---|
| 5,283,639 A | * | 2/1994 | Esch et al. | 725/32 |
| 5,361,256 A | | 11/1994 | Doeringer et al. | 370/60 |
| 5,424,770 A | * | 6/1995 | Schmelzer et al. | 348/705 |
| 5,477,263 A | * | 12/1995 | O'Callaghan et al. | 725/102 |
| 5,499,046 A | * | 3/1996 | Schiller et al. | 725/145 |
| 5,510,844 A | | 4/1996 | Cash et al. | 348/465 |
| 5,600,573 A | * | 2/1997 | Hendricks et al. | 725/109 |
| 5,617,565 A | | 4/1997 | Augenbraun et al. | 395/604 |
| 5,659,350 A | * | 8/1997 | Hendricks et al. | 725/116 |
| 5,682,195 A | * | 10/1997 | Hendricks et al. | 725/116 |
| 5,701,582 A | * | 12/1997 | DeBey | 725/103 |
| 5,758,257 A | * | 5/1998 | Herz et al. | 725/116 |
| 5,768,528 A | | 6/1998 | Stumm | 395/200.61 |
| 6,084,581 A | * | 7/2000 | Hunt | 707/500.1 |
| 6,181,334 B1 | * | 1/2001 | Freeman et al. | 725/138 |

FOREIGN PATENT DOCUMENTS

| | | | |
|---|---|---|---|
| WO | WO 95/05050 | 2/1995 | |
| WO | WO 97/09827 | 3/1997 | |

OTHER PUBLICATIONS

Microsoft Computer Dictionary, Microsoft Corporation, Fourth Edition, pp. 105 and 486.*

A. Arcidiacono, "*Multimedia Services and Data Broadcasting Via Satellite*", Electronics & Communication Engineering Journal (Feb. 1997).

* cited by examiner

Primary Examiner—Andrew Faile
Assistant Examiner—Jason Salce
(74) Attorney, Agent, or Firm—Darby & Darby

(57) ABSTRACT

A distributed broadcast system for receiving, processing, scheduling and broadcasting a wide variety of media objects is disclosed. The system comprises: a media object tracking system, a channel editing segment, a broadcast facility, and a plurality of end-user PCs. The media object tracking system receives media objects from a plurality of distinct sources and tracks their distribution, modification, and use. Associated with the media-object tracking system are a plurality of editing stations, where received media objects may be processed to create broadcast-ready material. The channel editing segment preferably comprises a plurality of channel editing centers (CECs) and one or more channel management centers (CMCs) which aggregate broadcast-ready media objects and schedule them for broadcast. Each scheduled media object is encoded in accordance with subscription information associated with the service to which the media object belongs. The encoded media object is multiplexed onto a time-division-multiplex channel of a broadcast bit stream. The broadcast facility transmits the encoded bit stream via a broadcast channel. Appropriately equipped end-user PCs receive the transmission and provide the end-user with access to those portions of the broadcast which the end-user is authorized to receive.

39 Claims, 8 Drawing Sheets

METHOD AND SYSTEM FOR BROADCAST TRANSMISSION OF MEDIA OBJECTS

BACKGROUND OF THE INVENTION

The quantity and variety of information available on the internet is vast. For many end-users, however, practical access to much of what the internet has to offer is foreclosed because they do not have an efficient way to download the available information. Traditionally, end-users have accessed the internet via telephone lines and other land-lines which have only a narrow bandwidth. Insufficient bandwidth causes long, frustrating waits, especially when large media objects, such as video clips, are downloaded from the internet onto the user's computer. A 2 Mb video object, for example, may take as long as an hour to download.

Another drawback of the traditional internet, is that the wealth of available material is not well organized. Consequently, users must resort to search engines in order to identify internet sites that might be of interest to them. These search engines, however, are relatively slow and may fail to identify all sites that are in fact of interest to the user.

One possible solution to the bandwidth dilemma is to transmit information from the internet to users by broadcasting it to them. For example, each conventional analog television channel has sufficient bandwidth to transmit 40 Mbps, which is sufficient for many needs. Moreover, satellite and cable broadcasts may have a bandwidth as great as240 Mbps. These large bandwidths largely relieve the bandwidth insufficiencies of the prior art.

But broadcast has its own difficulties. One important feature of the internet is that each content provider can control the content, timing, and target of every object that it transmits. By contrast, scheduling and distribution control in the broadcast environment is typically controlled by the entity that maintains and operates the broadcast facility. Moreover, broadcast facilities have traditionally been employed to transmit a single type of media object, e.g., television programming. Thus, broadcasters do not have the capability to handle the many classes of media object, including video, audio, and data, available via the internet.

SUMMARY OF THE INVENTION

The present invention provides a distributed broadcast system for processing, scheduling, and broadcasting a wide variety of media objects. The media objects may comprise static objects such as data files or dynamic objects such as streaming video, audio, or data.

In a preferred embodiment, the broadcast system of the present invention comprises a media object tracking system, a channel editing segment, a broadcast facility, and a plurality of end-user PCs.

The media object tracking system receives media objects from a plurality of distinct sources and tracks their distribution, modification, and use. Associated with the media-object tracking system are a plurality of editing stations, where received media objects may be processed to create broadcast-ready material.

The channel editing segment preferably comprises a plurality of channel editing centers (CECs) and one or more channel management centers (CMCs) which aggregate broadcast-ready media objects and schedule them for broadcast. Each scheduled media object is encapsulated or encoded in accordance with subscription information associated with the service to which the media object belongs. The encoded media object is multiplexed onto a channel of a broadcast bit stream.

The broadcast facility transmits the encoded bit stream via a broadcast channel. Appropriately equipped end-user PCs receive the transmission and provide the end-user with access to those portions of the broadcast which the end-user is authorized to receive.

BRIEF DESCRIPTION OF THE DRAWINGS

The above objects and summary of the invention will be better understood when taken in conjunction with the following detailed description and accompanying drawings, in which.

Figure 1:
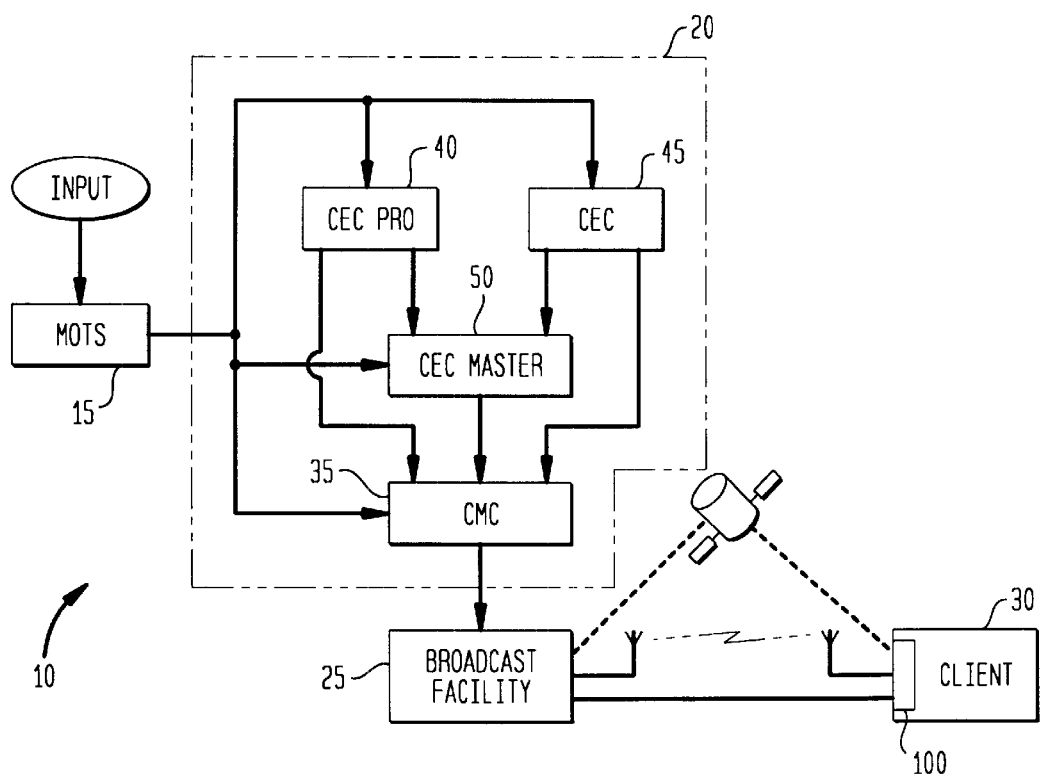
FIG. 1 is a block diagram of a preferred embodiment of the broadcast system of the present invention.

Except for FIG. 1, all reference numerals illustrated in the drawings are even numbers and so references in the specification to a range of reference numerals (such as "208–212") does not imply odd number reference numerals; however, he invention is not limited by the specific embodiments illustrated in the drawings.

DETAILED DESCRIPTION OF THE PREFERRED EMBODIMENT

FIG. 1 is a block diagram of a preferred embodiment of the broadcast system of the present invention. As shown in FIG. 1, the broadcast system, designated generally by numeral 10, comprises: a media object tracking system (MOTS) 15, a channel editing segment 20, a broadcast facility 25, and a plurality of end-user PCs 30, only one of which is shown in FIG. 1. Channel editing segment 20 comprises a channel management center (CMC) 35, a professional channel editing center (CEC Pro) 40, a channel editing center (CEC) 45, and a master channel editing center (CEC Master) 50. Although FIG. 1 depicts only a single CEC Pro 40, CEC 45, CEC Master 50, CMC 35, and broadcast facility 25, it should be recognized that the system may preferably comprise one or more of each of these components.

Operation of broadcast system 10 will first be briefly described in connection with FIG. 1. The structure and operation of the components of broadcast system 10 will then be more fully described in connection with FIGS. 2–10.

Typical data flow through broadcast system 10 is schematically represented by the arrows connecting blocks 15–50 in FIG. 1. Initially, MOTS 15 receives media objects, such as proprietary or public-domain audio, video, image, and text based works. One function of MOTS 15 is to track the distribution and usage of received media objects as they traverse the broadcast system. This tracking function is performed with the aid of a database that stores distribution and usage information concerning media objects received by MOTS 15. In addition, some received media objects may require editing or other processing before being ready for broadcast. Such media objects are transmitted to channel editing stations (CECS) connected to MOTS 15 where they are edited and prepared for broadcast. These and other features of MOTS 15 are more fully described below in connection with FIG. 2.

Once a media object is ready for broadcast, it is transmitted to a CEC or CMC for aggregation and broadcast scheduling. Media objects for broadcast may also be provided directly to a CEC or CMC without passing through and being processed by MOTS 15. Broadcast scheduling is performed by a scheduler resident in a CMC 35, CEC Pro 40, or CEC Master 50. A preferred embodiment of a scheduler 30 for use in the present invention is described in detail in connection with FIGS. 3 and 4. A preferred embodiment of CMC 35 is described in connection with FIG. 5. A preferred embodiment of CEC Master 50 is described in connection with FIG. 6. A preferred embodiment of CEC Pro 40 is described in connection with FIG. 7. CEC 45 does not comprise a scheduler and is therefore suitable for aggregation of media objects for broadcast, but not for broadcast scheduling. A preferred embodiment of CEC 45 is described in connection with FIG. 8.

As the scheduled broadcast time for a media object arrives, CMC 35 multiplexes the media object onto a channel in accordance with received scheduling instructions. The multiplexed signal is transmitted to a broadcast facility 25 for broadcast to end-user PCs 30. In the preferred embodiment of the invention described herein, the multiplexing technique employed is time-division multiplexing. However, the invention may also be practiced using numerous other multiplexing techniques such as frequency-division multiplexing or statistical multiplexing.

The components of broadcast system 10 will now be described in more detail in connection with FIGS. 2–10.

Figure 2:
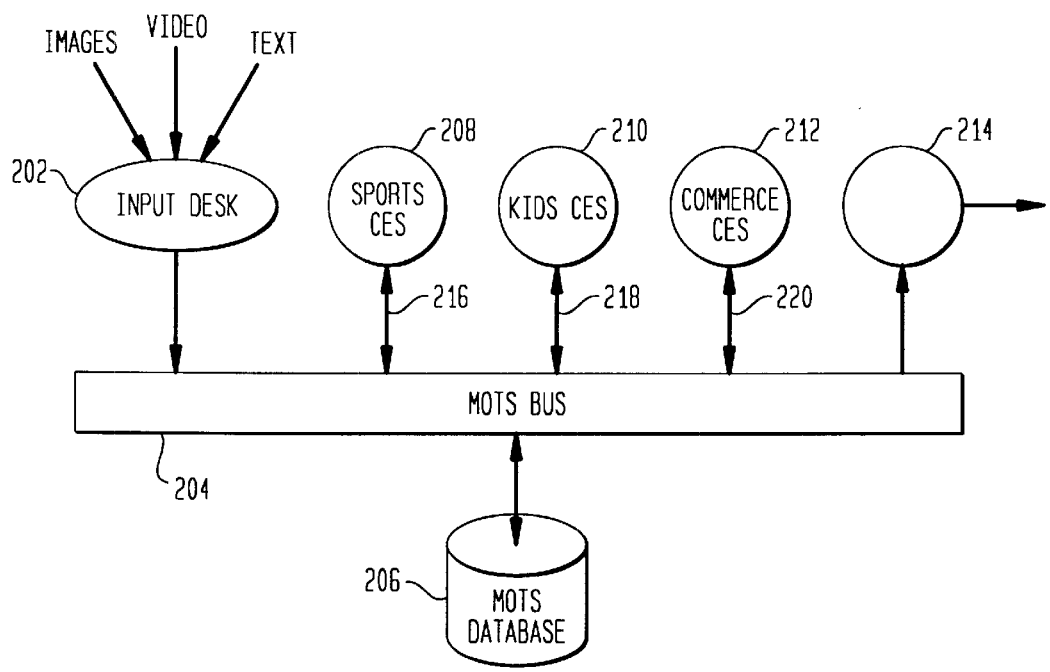
FIG. 2 is a block diagram of a preferred embodiment of the media object tracking system of the present invention.

FIG. 2 is a block diagram of a preferred embodiment of MOTS 15. As shown in FIG. 2, MOTS 15 preferably comprises an input desk 202 for receiving media objects from content providers. Input desk 202 is connected to a bus 204. Also connected to bus 204 are a MOTS database 206, and one or more channel editing stations (CESs) 208–212, described in more detail below. CMC 35, CEC Pro 40, CEC 45, and CEC Master 50 are also connected to bus 204 via an interface 214.

Input desk 202 is adapted to receive many different types of media object such as images, video, or text. When a media object is received, it is assigned one or more object attributes (metadata) by input desk 202. The assigned attributes are representative of the character of the received object. For example, a particular media object might be assigned a first attribute representative of the fact that the object is video footage, and a second attribute representative of the fact that the object is suitable for viewing by children. Input desk 202 creates a new record in MOTS database 206 for each media object it receives. The record comprises an identifier for the media object as well as the object attributes assigned to the object.

Although only a single input desk 202 is shown in FIG. 2, the system may comprise one or more input desks, each suitable for receiving and processing one or more types of media objects. Illustratively, each content provider could be provided with an input desk 202 for processing media objects received from the content provider. Input desks 202 may be located in remote locations and may be connected to the rest of MOTS 15 by a network.

In some cases, the media objects received by MOTS 20 may represent complete data, audio, or video objects that have been fully edited and are ready for broadcast. This may occur, for example, when the media objects are received from Disney (TM) or another large content provider. In that event, the media objects received by MOTS 15 are transmitted directly to a CEC or CMC for aggregation and scheduling, as described below.

In other cases, the media objects received by MOTS 15 may represent data, audio, or video objects that are not intended for broadcast as-is, but rather are to be edited and/or combined with other media objects to create, for example, multimedia objects. For example, a content provider might provide video footage of exotic animals with the intent that the footage be incorporated in a derivative multimedia object comprising text and video such as a children's encyclopedia. Editing may be performed manually or may be automated.

Editing of media objects received by MOTS 15 is preferably performed at channel editing stations 208–212, which are connected to bus 204 of MOTS 15 via links 216–220, respectively. Links 216–220 may be any suitable communication link for connecting channel editing stations 208–212 to MOTS bus 204, such as a wide area network or dedicated lines. This permits CESs 208–212 to be located remote from MOTS bus 204, for example, in another country.

Typically, channel editing stations 208–212 are operated by content providers who produce broadcast-ready data, video, and audio objects. These objects may incorporate content created by others, such as content received by MOTS 15 via input desk 202 or other sources.

Using channel editing stations 208–212, these content providers may access media objects received at input desk 202. The channel editing stations edit the received media objects and/or incorporate them into derivative works. As noted, editing may be performed by system operators or may be fully or partially automated. When a media object is modified or incorporated in a derivative media object, that fact is recorded in the object's record in MOTS database 206. Thus, in contrast to prior art internet systems, the system of the present invention is able to track the distribution, modification, and use of particular media objects, which provides many benefits. For example, tracking permits owners of media objects to police the use and distribution of their creations and better exploit intellectual property rights to which they may be entitled.

Another purpose of the data attributes is to ensure appropriate distribution of media objects to channel editing stations 208–212. For example, certain media objects may be suitable for adult viewing only, and will be assigned a data attribute representative of that fact. Any channel editing station designated to produce programming for children (e.g., station 210) will not be able to access media objects with this "adult", data attribute. Thus, in contrast to prior art internet schemes, the present invention is able to track and control the use and distribution of all received media objects, thus protecting the rights and limiting the liabilities of content providers, broadcasters, and end-users.

Once a media object is ready for broadcast, it is transmitted to a CEC or CMC for aggregation and broadcast scheduling. Broadcast scheduling is the process of assigning broadcast parameters such as broadcast time, channel, and bandwidth to an object intended for broadcast.

Scheduling is necessary because the amount of data that can transmitted by a broadcast facility, although enormous, is not unlimited. Broadcast facilities typically transmit over particular frequency bands called channels.

The rate at which a broadcast channel can transmit information (frequently measured in units of millions of bits per second (Mbps)) is related to the difference in frequency between the highest and lowest frequencies in the band, and is therefore often referred to as the bandwidth of the channel.

The bandwidth of a broadcast channel is frequently subdivided into two or more channels using a multiplexing technique, such as time-division multiplexing (TDM). In time-division multiplexing, each TDM channel is assigned a particular time interval for broadcast. This permits concurrent broadcast of two or more signals over a single broadcast channel. The bandwidth of a TDM channel is the capacity of the channel to transmit information and is typically measured in units of millions or thousands of bits per second. Of course, the total bandwidth of all TDM channels that make up the broadcast channel cannot exceed the total bandwidth of the broadcast channel.

Thus, the capacity of a broadcast facility to broadcast information is not unlimited. This finite capacity must be shared among all content providers desiring to broadcast media objects from the facility. It is therefore important to provide scheduling apparatus and methods for efficiently allocating particular portions of the available broadcast bandwidth to particular media objects to ensure timely and complete transmission of all media objects to be broadcast.

In a preferred embodiment, the present invention provides a distributed scheduling capability that permits scheduling of broadcasts to be performed at one or more of a plurality of scheduling locations. Typically, CEC Pro 40, CEC Master 50, and CMC 35 will constitute scheduling locations. Each scheduling location is provided with a scheduler. A preferred embodiment of a scheduler is now described in connection with FIG. 3.

Figure 3:
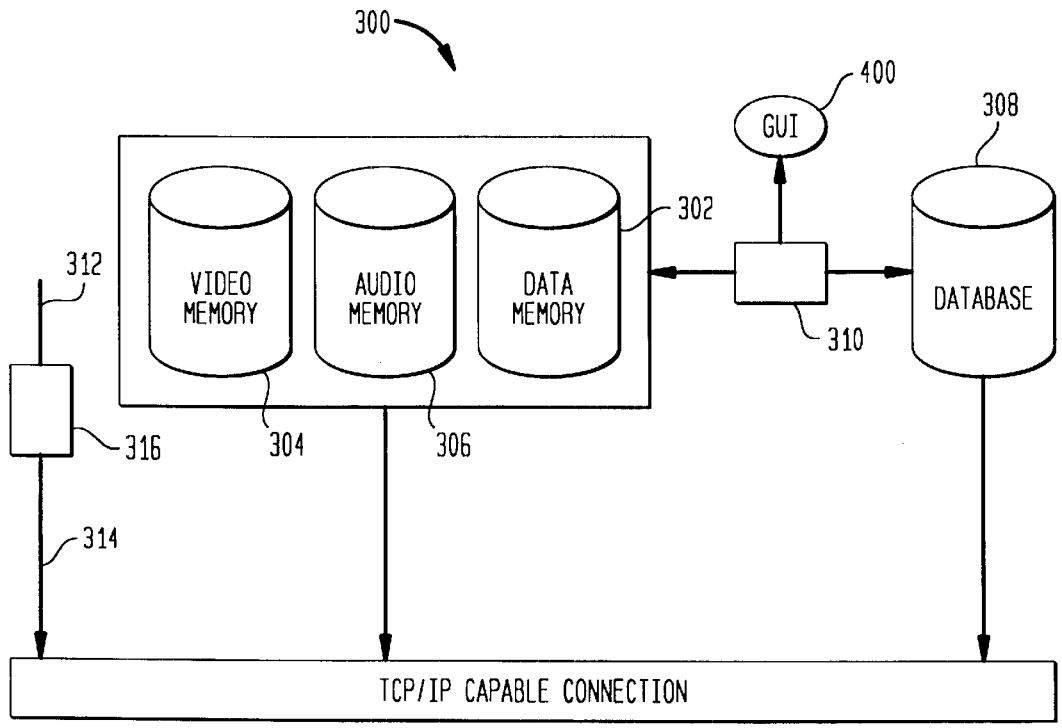
FIG. 3 is a block diagram of a preferred embodiment of the broadcast scheduler of the present invention.

As shown in FIG. 3, a scheduler 300 preferably comprises a data memory 302, a video memory 304, and an audio memory 306, for storing broadcast-ready data objects, video objects, and audio objects, respectively. Scheduler 300 further comprises an attribute database 308, for storing attribute data (metadata) concerning broadcast parameters of the objects stored in memories 302–306. For example, for a video object to be transmitted, attribute database 308 might store the bandwidth required to transmit the object, the time at which the object is to be broadcast, the size and name of the object, and the intended audience for the object.

A processor 310 is connected to memories 302–306 and database 308. As described below, processor 310 manages broadcast scheduling of media objects stored in memories 302–306 as well as streaming media objects that may be dynamically transmitted via one or more lines 312, 314 and streaming interface 316. Attribute data for these dynamic objects may also be stored in attribute database 308. In a preferred embodiment, processor 310 comprises a software program running on a Windows NT (TM) or Windows 95 (TM) work station.

Scheduler 300 is responsible for scheduling broadcasts for particular blocks of bandwidth on specific TDM channels. Illustratively, a particular scheduler 300 might be responsible for scheduling broadcast content for 4 Mbps of bandwidth from 7:00:00 AM to 8:00:00 AM on Mar. 14, 1998.

Scheduler 300 allocates portions of this bandwidth to static objects stored in memories 302–306 and dynamic objects streaming via line 312 in accordance with the objects attribute data stored in attribute database 308. Continuing with the above illustrative example, scheduler 300 might allocate 1.4 Mbps between 7:20:00 AM and 7:23:05 to broadcast a music video over a particular TDM channel that broadcasts music videos during the morning hours. Alternatively, it might allocate 100 kbs between 7:00:00 and 8:00:00 to establish a "carousel", that repeatedly plays out a 30 second audio file comprising the day's weather forecast.

Processor 310 may be programmed to automatically perform all broadcast scheduling. Alternatively, all or some of the scheduling may be performed by a system operator. In a preferred embodiment, manual scheduling is aided by a graphical user interface (GUI) 400 which permits the user to manipulate (using, e.g., a mouse) graphical icons representative of objects to be broadcast and to visually perceive the entire broadcast schedule for the bandwidth allocated to scheduler 300. A preferred embodiment of GUI 400 is shown in FIG. 4.

Figure 4:
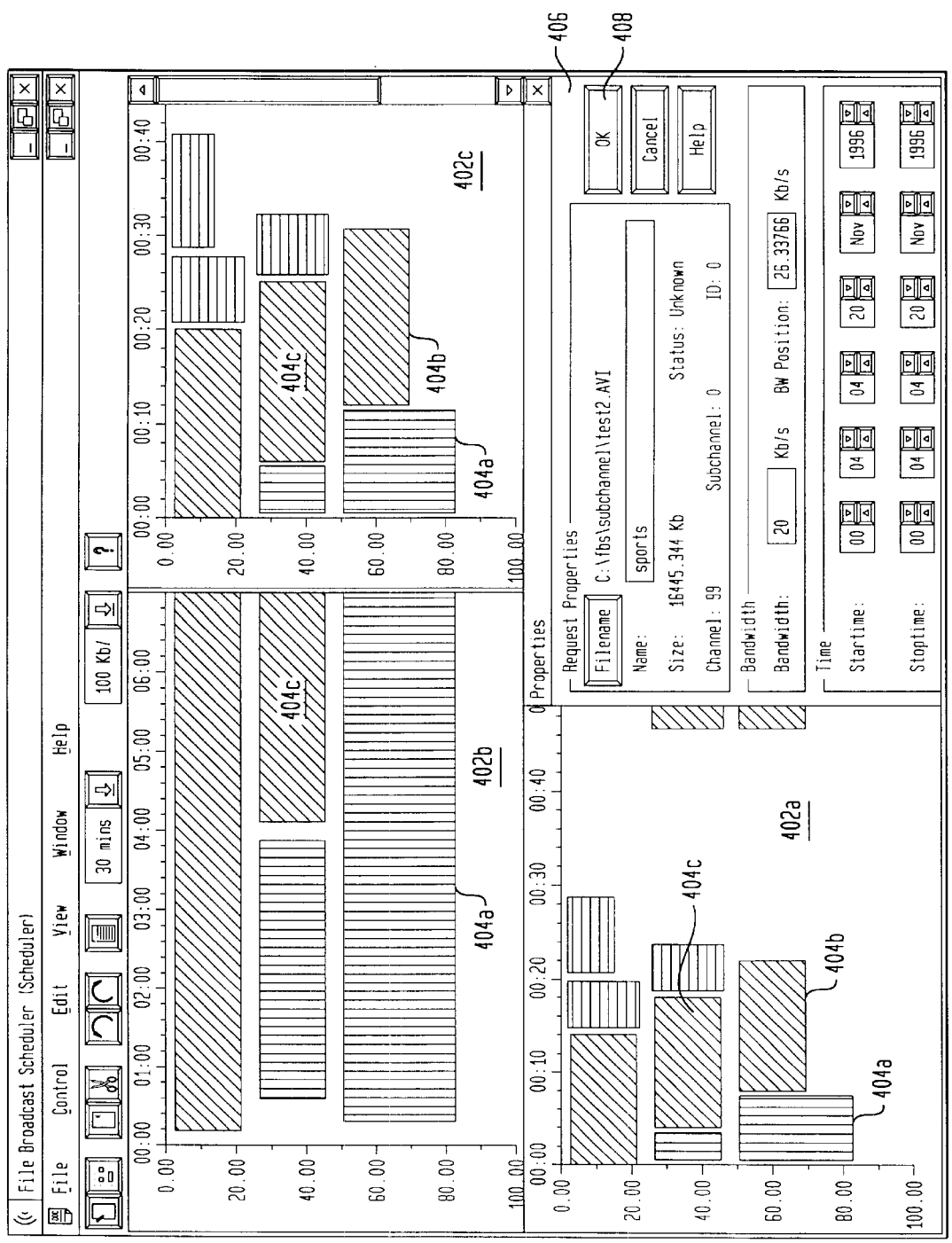
FIG. 4 is a preferred embodiment of a graphical user interface for the broadcast scheduler depicted in FIG. 3.

As shown in FIG. 4, GUI 400 preferably comprises a plurality of windows 402a, 402b, 402c (more generally referred to sometimes as "402"). Windows 402 graphically display the bandwidth allocation for a plurality of media objects 404a, 404b, 404c (more generally referred to sometimes as "404") scheduled for broadcast.

For example, the bandwidth allocated to media object 404c is graphically represented as a rectangle in windows 402 having a height of 20 kb/s and a width of approximately 14 minutes. It should be noted that each rectangle 404 may represent a single data object for broadcast, or may, for example, be representative of a directory comprising a plurality of files. Alternatively, a rectangle may represent a recorded video or audio object, or a block of bandwidth allocated to streaming audio, video, or data.

In a preferred embodiment, the axes of one or more of windows 402 (i.e., time and bandwidth) are drawn to different scales in order to provide the system operator with differing perspectives of the broadcast schedule. For example, in the illustrative example depicted in FIG. 4, the scale of the time axis of window 402a is approximately ten times as great as that of window 402b. Thus, the system operator can view window 402a in order to understand the "big picture", (approximately a one-hour window of the broadcast schedule), while focusing on window 402b in order to view the specifics of the broadcast schedule in ten second increments.

As described in more detail below, each of the media objects represented by rectangles 404 may belong to a particular service. In a preferred embodiment, the color of rectangles 404 may be representative of the service to which the media object associated with the rectangle belongs. For example, all media objects belonging to a particular service may be represented by rectangles that are red.

Scheduling information for the media objects graphically represented by rectangles 404 may also be numerically represented in a window 406. In the illustrative example shown in FIG. 4, window 406 displays quantitative and attribute information for media object 404c.

Window 406 preferably comprises a plurality of fields for storing information regarding a particular media object to be broadcast. Illustratively, window 406 may comprise the following fields:

1. a filename field, which stores the filename of the media object (e.g., C:\fbs\subchannel\test2.AVI).

2. a name field, which stores the name of the media object (e.g., sports).
3. a size field, which stores the size in kilobytes or megabytes of the media object (e.g., 16445.344 kB).
4. a status field, which stores the file name or directory name to be transmitted (e.g., unknown).
5. a channel field, which stores the TDM channel on which the media object is to be broadcast (e.g., 99).
6. a subchannel field, which stores information representative of the service on which the file is to be streamed out (e.g., 0).
7. an ID field, which stores an identifier for the channel (e.g.,0).
8. a bandwidth field, which stores the bandwidth allocated to broadcast the media object.
9. a bandwidth position field, which stores the vertical offset relative to zero of the bandwidth allocated to the object (i.e., the location of the object in the pipe).
10. a start time field, and
11. a stop time field, which define the time period allocated to broadcast the media object (e.g., from 00:04:04 on Nov. 20, 1996 to 00:17:47 on Feb. 20, 1996).

In a preferred embodiment, a blank template having the same fields and arrangement as window 406 may be employed to schedule media objects for broadcast. In particular, by clicking on an appropriate icon, an operator may cause a blank window 406 to be displayed on the screen. The operator may then enter the broadcast attributes of the media object into the appropriate fields. When the operator clicks on OK area 408, GUI 400 establishes a new rectangle that graphically represents the broadcast attributes of the media object, and displays the rectangle in the appropriate windows 402.

Similarly, the broadcast attributes of a media object may be modified using window 406. In particular, an operator may call up a window 406 for any displayed media object 404 by clicking on the object. The operator may then update any field in window 406. GUI 400 then updates the stored broadcast attributes for the media object and, if appropriate, changes the shape and/or location of the rectangle that graphically represents the updated media object.

In a preferred embodiment, an operator may also directly modify certain broadcast attributes in a graphical manner. In particular, the user may click on any media object 404 and "drag",it to another available portion of bandwidth (i.e., to any blank space in a window 402). In this way, the user may graphically schedule all media objects to be broadcast.

The present invention may employ automated scheduling algorithms to optimize utilization of the available bandwidth. A system operator may input information concerning a plurality of objects including static and streaming data, video, and audio to be broadcast, and scheduler 300 may determine a schedule for broadcasting the plurality of items so as to efficiently use the available bandwidth.

In addition, the objects to be broadcast may be compressed prior to transmission and scheduled for broadcast in accordance with their bandwidth requirements in compressed form. Decompression is performed by PC 30 when it receives the broadcast, thus permitting media objects to be broadcast in compressed form in a manner transparent to the end-user of PC 30.

A preferred embodiment of CMC 35 will now be described in connection with FIG. 5. It is contemplated that CMC 35 will typically be operated by a broadcast service provider such as a television network. A significant fraction of the broadcast content managed by CMC 35 will therefore typically comprise professionally-produced media objects from large content providers (e.g., Disney (TM)) with whom the broadcaster has an established relationship.

Figure 5:
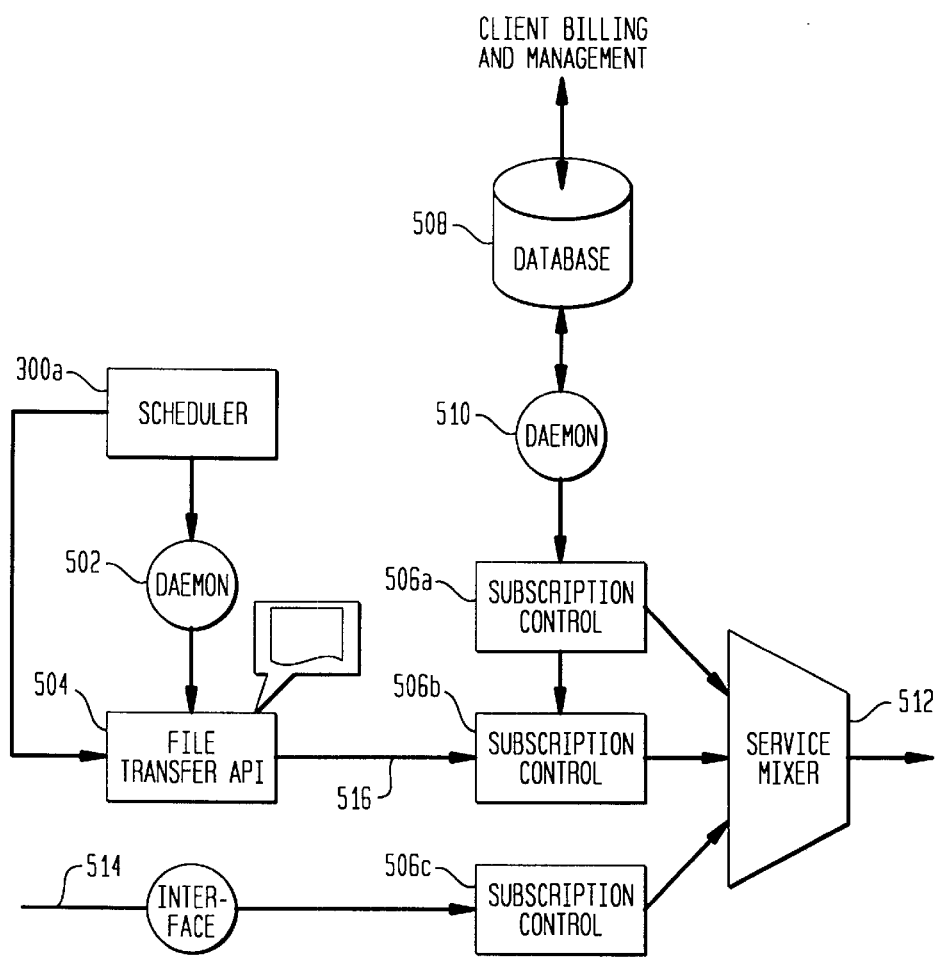
FIG. 5 is a block diagram of a preferred embodiment of a channel management center of the present invention.

Turning to FIG. 5, CMC 35 preferably comprises a scheduler 300a, having the same architecture as the scheduler 300 described above in connection with FIG. 3. CMC 35 further comprises a media-object retrieval manager 502 which monitors attribute database 308 of scheduler 300a. When media-object retrieval manager 502 determines that the time for broadcasting a particular media object is approaching, it retrieves the attribute data for the object from database 308 of scheduler 300a.

Concurrently, media-object retrieval manager 502 instructs file transfer manager 504 to retrieve the media object to be broadcast from the appropriate memory 302–306 of scheduler 300a. File transfer manager 504 retrieves the media object from one of memories 302–306, and provides the file to a subscription control manager 506b, via line 516.

Alternatively, if the object to be transmitted is a dynamic object such as streaming video, media-object retrieval manager 502 instructs interface 316 to pass the streaming video via line 314 directly to subscription control manager 506b In a preferred embodiment, CMC 35 further comprises a subscription database 508 that stores billing and subscription information concerning media objects to be broadcast by broadcast system 10. This information is used to control access by end-users to broadcast media objects that they receive, as described below.

In particular, the present invention contemplates parsing the universe of broadcast objects into a plurality of broadcast services. A broadcast service comprises a collection of media objects that share a common subject matter or audience. For example, one broadcast service might focus on golf related programming while another might consist exclusively of childrens programs.

Each media object to be broadcast is assigned to a specific broadcast service by broadcast system 10. Subscription database 508 maintains a list of the broadcast service to which each media object belongs.

In a preferred embodiment, broadcast system 10 supports six different types or categories of broadcast services. The first service category is "free to air services.", Services belonging to this category may be received by clients at no cost and without registration or a return path connection to the content provider.

The second service category is "free subscribed services."Clients must register to receive services belonging to this category, but registration is free. Subscription to broadcast services belonging to this category may require that the end-user have a return path connection to the content provider. For example, the end-user may be required to subscribe to the service via a return connection to the content provider.

The third service category is "subscription services.", End-users must register in order to receive services belonging to this category, and there is a fee for registering. Subscription to services belonging to this category may require that the end-user have a return path connection to the content provider.

The fourth service category is "pay-per-item." End-users must pay a one-time charge in order to receive broadcast services that belong to this service category. End-users may be required to have a return path connection to the content provider in order to receive services belonging to this service category.

The fifth service category is "open multimedia distribution platform.", This platform can be used to provide both consumer and business services and interfaces to the network operating center through an IP multicast or other input. As those skilled in the art recognize, the term unicast refers to transmission of information to one site at time. In contrast, multicast refers to transmission of information to more than one site at a time. Preferably, the platform comprises an open software platform to provide a common interface to the content provider and end-user for all media broadcast categories. In a preferred embodiment, a common interface allows the seamless integration of new applications and content into the platform. One advantage of this platform is that it eases the porting of readily available services on other transport streams to DVB-S. For example, it enables real-time data services that are restricted to VBI, and audio/video streaming services. The sixth service category is "additional services.", Additional services preferably consist of services that provide interfacing to: conditional access systems, subscriber management systems, billing systems, NDIS drivers for PC broadcast receiver cards, and customized programs for the automation of content delivery and presentation. These interfaces are preferably standardized such that an interface to a PC card from a first manufacturer uses the same generic instructions as an interface to a PC card from a second manufacturer.

One or more broadcast services may be bundled together to form subscription packages. In that event, a single subscription would entitle an end-user to receive all services included in the package. For example, an end-user who was a fan of many sports might subscribe to a sports package that would provide access to a variety of broadcast services each of which is related to a different sport.

CMC 35 further comprises one or more subscription control managers 506a, 506b, 506c (more generally referred to sometimes as "506"), including subscription control manager 506b whose function is to encapsulate or encode media objects in accordance with subscription information from subscription database 508, and to load the encapsulated or encoded media object onto TDM channels with communication from daemon or subscription information retrieval manager 510.

Specifically, recall that file transfer manager 504 retrieves the media object to be broadcast from the appropriate memory 302–306 of scheduler 300a and provides the media object to an output 516 where it is received by subscription control manager 506b. Alternatively, the media object to be broadcast is dynamically received by interface 316 and transmitted via line 314 to subscription control manager 506b. Subscription-information retrieval manager 510 then retrieves subscription information for the received media object from database 508 and transmits the information to subscription control manager 506b. Subscription control manager 506b encapsulates, encodes, or both encapsulates and encodes the media object in accordance with the subscription information received from database 508.

The encapsulation or encoding employed by the present invention may take many forms. For example, subscription control manager 506b may be programmed to identify the header and tail of a packet and wrap an additional protocol layer of subscription information around the packet.

Alternatively, the subscription information retrieved from subscription database 508 may comprise instructions to encode the media object in accordance with particular encryption software. Only clients who have subscribed to the service, and thus have the corresponding decryption software, will be able to receive the broadcast object.

In an alternative embodiment, the subscription information may be embedded in the transmission bitstream for example by watermarking each data packet. In this alternative embodiment, the subscription information need not be added to the bitstream by subscription control manager 506b. The subscription information may be added to the data at any point in the system and may be added by the content provider or by another party.

As described below, use of encapsulation or encoding permits the system of the present invention to enable or disable receipt of particular services by particular end-users.

Subscription control manager 506b further comprises a protocol handler for loading the encoded media object onto an appropriate TDM channel in a digital format, in accordance with the broadcast attributes defined for the object by scheduler 300a. The encoded media object is then transmitted to service mixer 512 for multiplexing with other streams of broadcast data.

The bitstream output by subscription control manager 506b may consist of complete media objects transmitted one after another. Alternatively, subscription control manager 506b may be adapted to packetise received media objects, interleave the packets from a plurality of media objects and output the interleaved packets as a bit stream. For example, if two files are to be delivered to a user concurrently, but one of the files is three times as long as the other, the protocol handler might packetise the two files and then interleave the packets at a ratio of three packets from the first file for every one packet from the second.

In a preferred embodiment, CMC 35 further comprises a subscription control 506a. As described in more detail below, the purpose of subscription control 506a is to transmit updated subscription information to the subscription manager of PC 30. The subscription manager of PC 30 uses this subscription information to identify subscribed services which may be accessed by the end-user.

As further shown in FIG. 5, CMC 35 further comprises a subscription control 506c that may receive additional streams via a line 514 from other sources such as a CEC, and multiplexes them onto appropriate TDM channels for broadcast in accordance with broadcast attribute information received from the CEC. This feature of the present invention is described in detail below, after CEC Master 50 and CEC Pro 40 have been described.

In a preferred embodiment, a CMC 35 having a play-out of 5 Mbps is implemented as one or more software programs running on an HP Unix Server and three NT Workstations.

Figure 6:
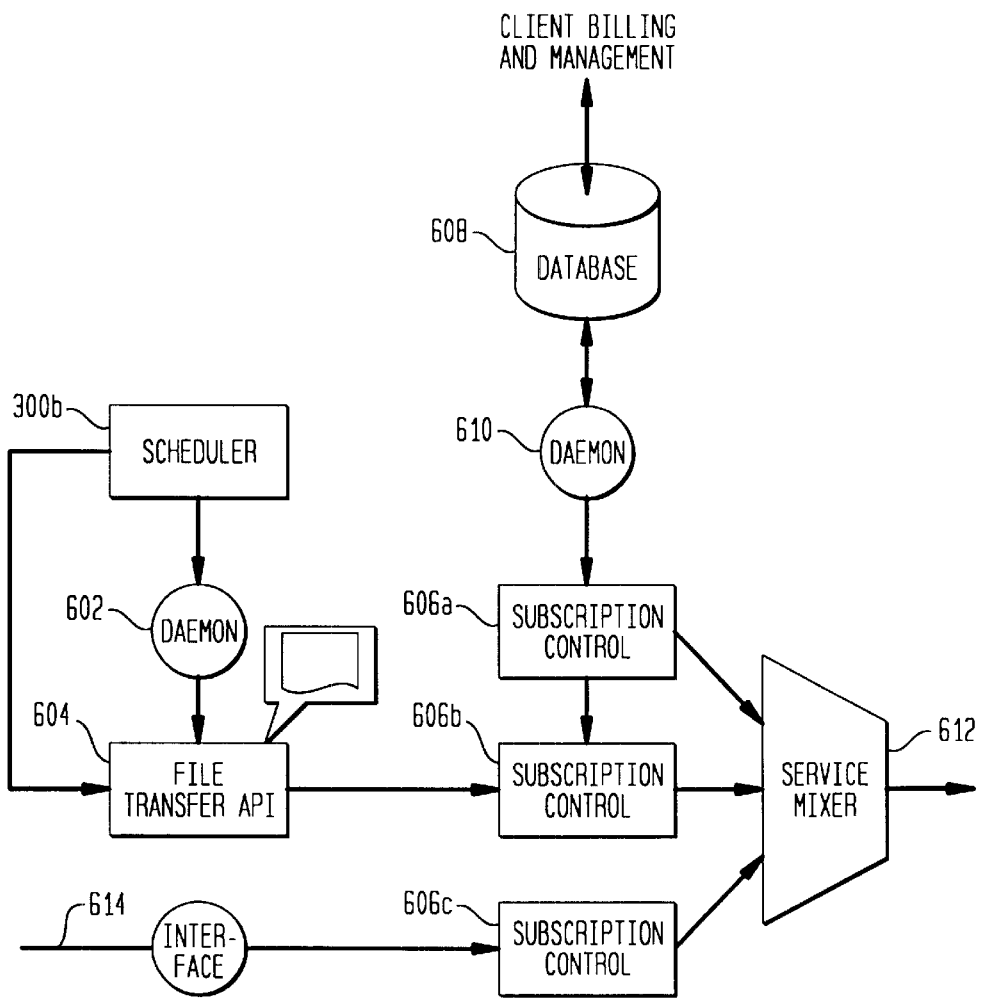
FIG. 6 is a block diagram of a preferred embodiment of a master channel editing center of the present invention.

A preferred embodiment of CEC Master 50 is shown in FIG. 6. As will be recognized, the architecture of CEC Master 50 is the same as that of CMC 35 illustrated in FIG. 5 and so corresponding reference numerals X02, X04, etc. have been assigned to the elements illustrated in FIG. 6 as are shown in FIG. 5. The size of each component, however, may differ since CEC Master 50 will typically have lower play-out bandwidths than CMC 35.

It is contemplated that CEC Master 50 will typically be maintained and operated by a bandwidth wholesaler, who purchases broadcast bandwidth in bulk from a broadcast service provider and resells segments of the bandwidth to others. Scheduling of the resold bandwidth may be administered using GUI 400 of scheduler 300b.

A preferred embodiment of CEC Pro 40 is now described in connection with FIG. 7. It is contemplated that CEC Pro 40 will typically be maintained and operated by a company that is not itself in the media or information-distribution business, but nevertheless requires an outlet to distribute data or video objects such as price lists, training videos, etc. In addition, the company might wish to broadcast streaming audio or video, e.g., to broadcast a live press conference to its customers announcing the roll-out of a new product. Thus, the contemplated uses of CEC Pro 40 require that it be capable of storing and scheduling static media objects for broadcast and acting as an interface for streaming data, audio, or video.

Figure 7:
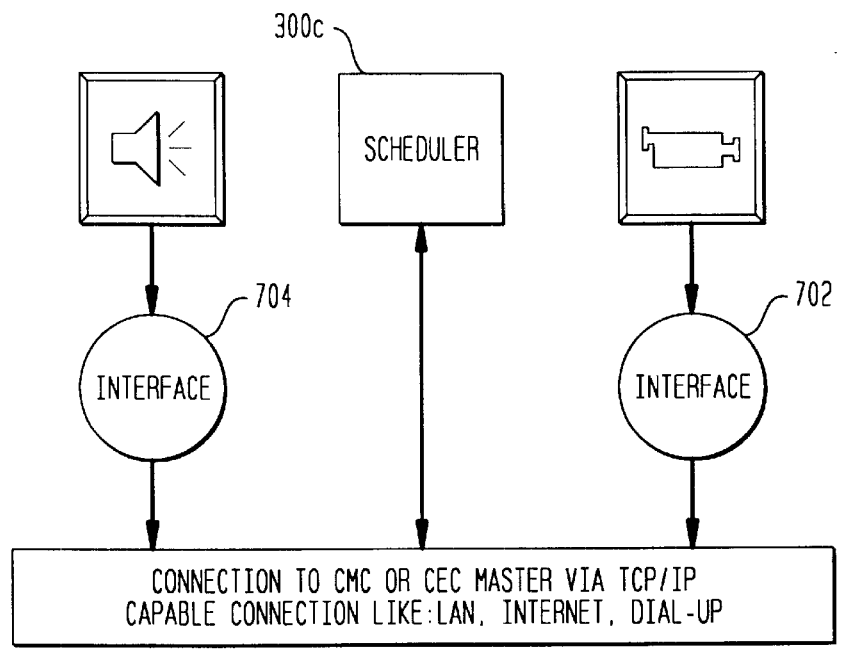
FIG. 7 is a block diagram of a preferred embodiment of a professional channel editing center of the present invention.

Accordingly, as shown in FIG. 7, CEC Pro 40 is provided with a scheduler 300c, having the same architecture as scheduler 300 described above in connection with FIG. 3.

In addition, CEC Pro 40 is provided with interfaces 702, 704, suitable for transmitting streaming video, audio, and data to a CEC Master 50 (via line 614) or CMC 35 (via line 514) for broadcast on a predesignated TDM channel.

In a preferred embodiment, CEC Pro 40 may be implemented as one or more software programs running on an NT (TM) Workstation.

Figure 8:
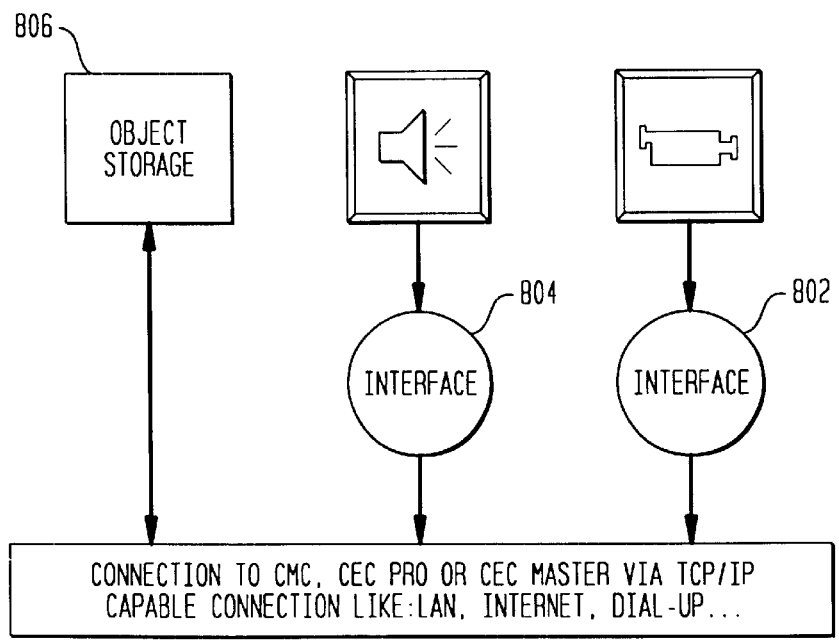
FIG. 8 is a block diagram of a preferred embodiment of a channel editing center of the present invention.

A preferred embodiment of CEC 45 is shown in FIG. 8. As shown in FIG. 8, CEC 45 is provided with interfaces 802, 804 (similar to interfaces 702, 704 of CEC Pro 40) suitable for transmitting streaming video and audio to a CEC Master 50 or CMC 35 for broadcast via a predesignated TDM channel. CEC 45 differs from CEC Pro 40, however, in that it does not comprise a scheduler 300. Instead, it comprises object storage 806, suitable for storing video, audio, and data media objects. CEC 45 is thus unable to schedule files for broadcast. It can, however, transmit stored files at a predetermined time to a CEC Master 50 or CMC 35 for multiplexing onto a predesignated TDM channel.

As noted above, CMC 35 has the capacity to receive data streams via line 514 from other sources, such as a CEC, and merge them onto appropriate TDM channels for broadcast in accordance with broadcast attribute information received from the CEC. This feature of the present invention permits distributed scheduling of broadcast bandwidth at a plurality of sites and by a plurality of service and content providers. It is also one way that the system permits many different types of transmissions to be merged into a single stream for transmission via a single broadcast channel.

For example, CMC 35 may sell a block of bandwidth on one or more TDM channels to a CEC Master 50, who may in turn resell segments of this bandwidth to one or more CEC Pros 40. One of the CEC Pros 40 may use its bandwidth segment to transmit video, while a second CEC Pro 40 may use its bandwidth segment to transmit data files. As discussed above, scheduling for each bandwidth segment is performed at the remote CEC Pro that purchased the segment.

The scheduled bandwidth segments are then transmitted as a broadcast-ready bit stream by their respective CEC Pros 40 to CEC Master 50 (via, e.g., line 614) where they may be mixed with other streams representing other bandwidth segments that were sold by CEC Master 50. Subscription control 606c of CEC Master 50 places the received stream onto an appropriate TDM channel, as described above.

This multiplexed stream is transmitted to CMC 35 where it is mixed with other streams of broadcast-ready content received from other CEC Masters 50 or generated by CMC 35 itself.

Figure 9:
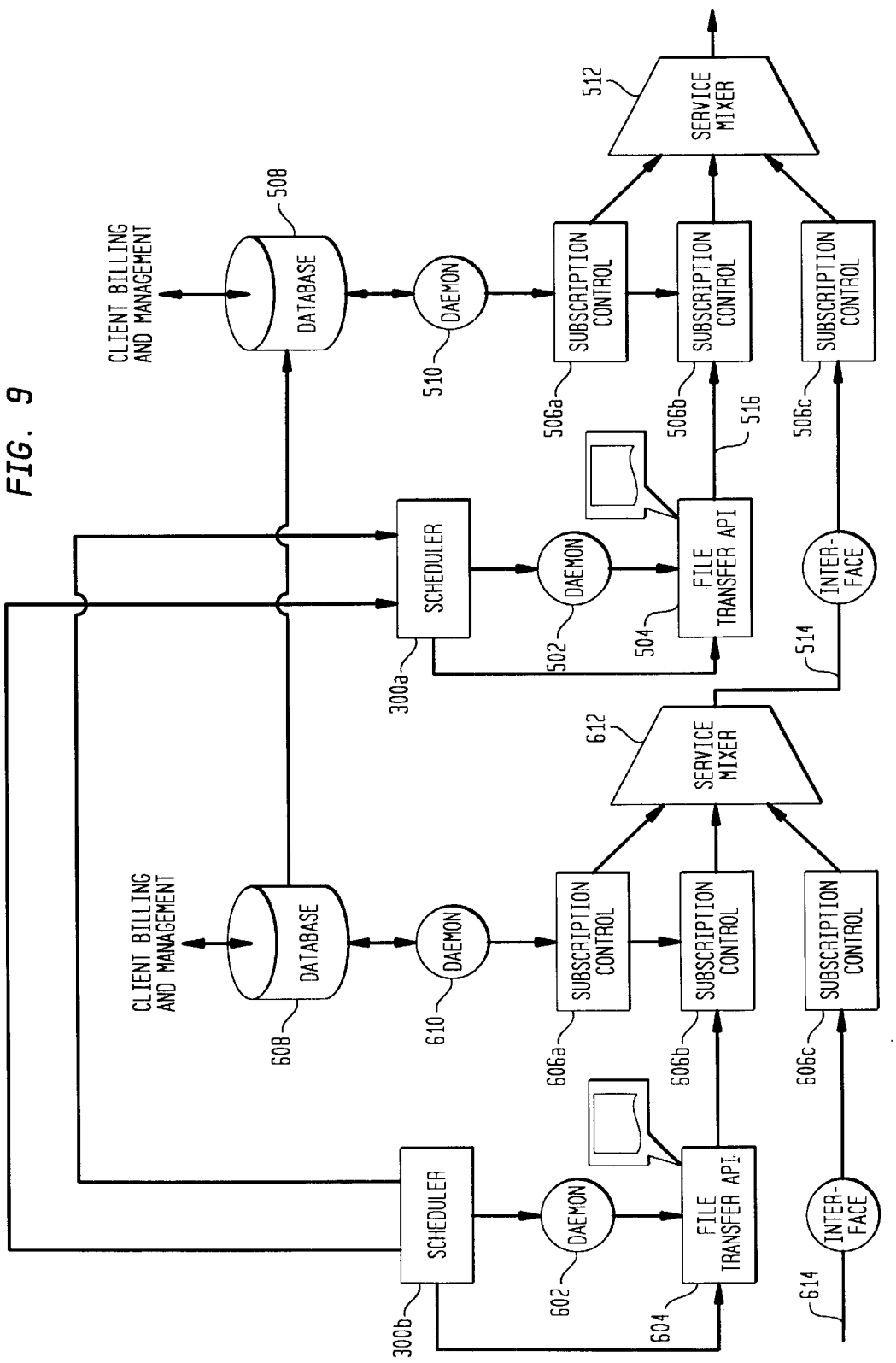
FIG. 9 is a preferred embodiment of a master channel editing center and a channel management center having cascaded schedulers.
Figure 10:
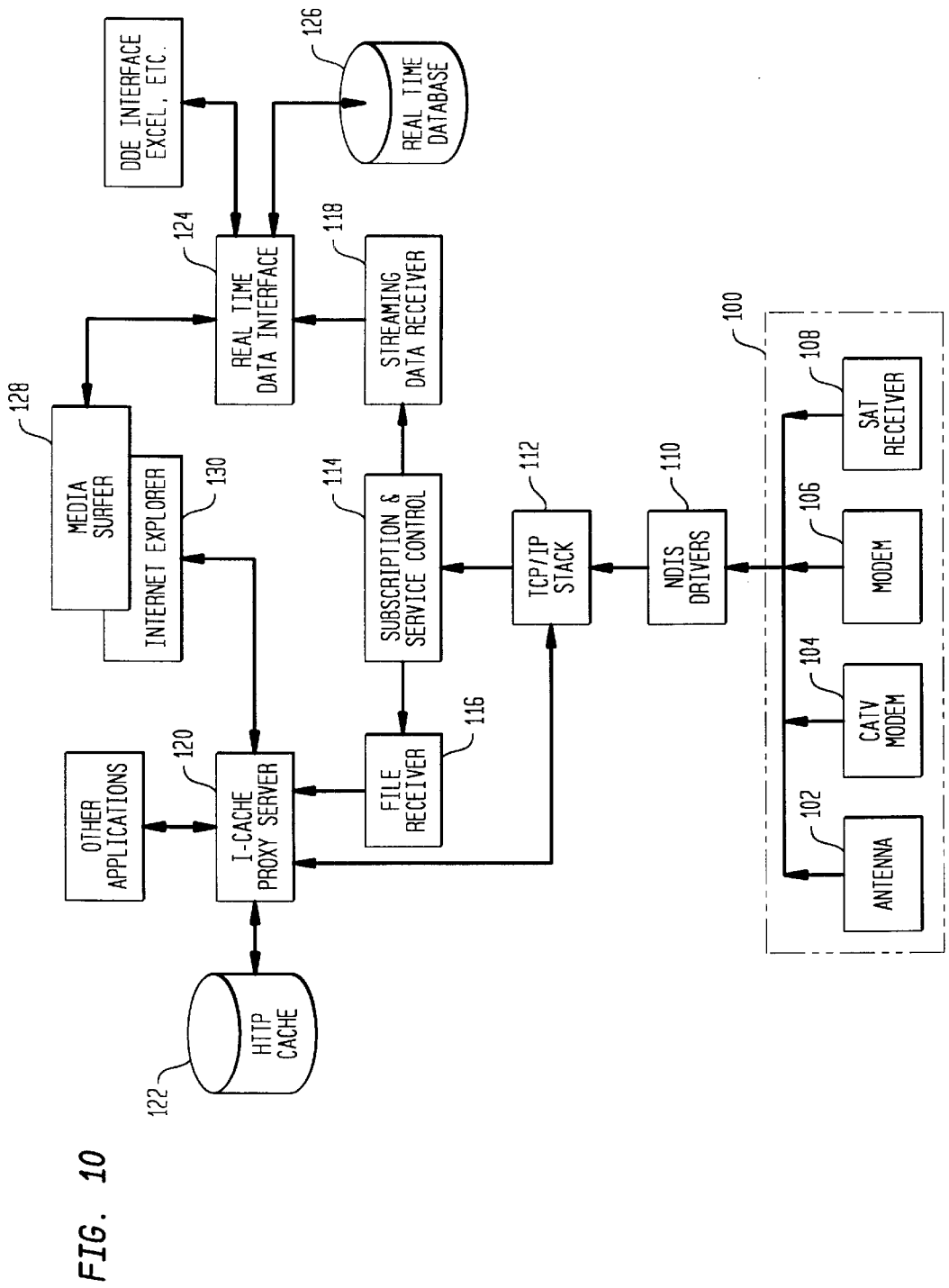
FIG. 10 is a block diagram of a preferred embodiment of an end-user PC of the present invention.

In an alternative embodiment, two or more schedulers 300 of a CEC Pro 40, CEC Master 50, and CMC 35, may be arranged in a cascade. FIG. 9 illustrates one such possible cascade, in which scheduler 300b of CEC Master 50 is cascaded with scheduler 300a of CMC 50. As in the first preferred embodiment described above, scheduler 300b of CEC Master 50 stores media objects and associated scheduling and subscription information scheduled for broadcast during the bandwidth for which CMC 50 is responsible. As the time for broadcast of a particular media object approaches, CEC Pro 40 retrieves the object and its associated scheduling information and transmits them to CEC Master 50, along with any subscription information associated with the media object. CEC Master receives the media object and its associated scheduling and subscription information and updates its scheduling and subscription databases in accordance therewith. Preparation of the media object as an encoded bit stream then proceeds as described above in connection with the first preferred embodiment.

The broadcast-ready bit stream output by CMC 35 is transmitted to broadcast facility 25. As schematically shown in FIG. 1, broadcast facility 25 broadcasts the received stream via one or more broadcast technologies, such as traditional television broadcast, cable-TV broadcast, or satellite broadcast. Other broadcast environments known to those skilled in the art may also be employed.

The broadcast transmission is received by end-user PC 30. A preferred embodiment of PC 30 will now be described in connection with FIG. 10. In the preferred embodiment described herein, the device employed by the end-user to receive the broadcast media objects is a PC 30. However, the invention may also be practiced using other devices for receiving the broadcast media objects, such as set-top cable boxes, provided that the devices comprise adequate hardware and software to achieve the functionality described below.

PC 30 preferably comprises a receiver 100 connected to a layered protocol such as TCP/IP stack 112 via NDIS drivers 110. TCP/IP stack 112 is connected to a subscription manager 114 whose purpose is to control access by the end-user to received information and to maintain a list of information services for the end-user.

Receiver 100 preferably comprises one or more components 102–108 adapted to receive broadcasts from broadcast facility 25. Receiver 100 may comprise an antenna 102 for receiving Rf television transmissions, a CATV modem 104 for receiving cable-TV transmissions, a satellite receiver 106 for receiving satellite transmissions, and/or a modem 108 for receiving transmission via a data link, depending on the broadcast technology employed by broadcast facility 25.

As noted, receiver 100 is coupled to a protocol stack such as TCP/IP stack 112 via NDIS drivers 110. In a preferred embodiment, TCP/IP stack 112 may comprise the Winsock (TM) TCP/IP stack manufactured by Microsoft Corporation. As known to those skilled in the art, one purpose of TCP/IP stack 112 is to examine the arriving data packets that make up a transmitted file or other media object to determine that all packets that make up the file have been received, and that they have been received in the correct order.

Once TCP/IP stack 112 verifies accurate reception of a TCP/IP communication, the communication is transmitted to subscription manager 114 which determines the subscription and service to which the communication belongs. Subscription manager 114 then determines whether or not PC 30 is authorized to receive the transmissions belonging to the identified service, and if authorized, whether the service has been enabled by the end-user. specifically, subscription manager 114 preferably comprises a software program running in the background of end-user PC 30. When desired, however, the end-user may maximize subscription manager 114 and have it display the list of services which end-user PC 30 is authorized to receive, i.e., all services included within subscription packages to which the end-user has subscribed. The end-user may then manually enable or disable services within a subscription package. For each authorized subscription package, subscription manager 114 maintains a record of the services that have been enabled and disabled by the end-user.

Then, when a communication is received, subscription manager 114 first determines whether the transmission belongs to a service to which the end-user has subscribed. Subscription manager 114 typically makes this determination by examining the received communication and determining whether it has the subscription information necessary to decode or unencapsulate the transmission.

As noted above, use of encapsulation or encoding permits the system of the present invention to enable or disable receipt of particular services by particular end-users. In a preferred embodiment, the system may enable particular PCs 30 to receive particular services by broadcasting a subscription message addressed to all end-user PCs that have subscribed to the service. The message preferably comprises information concerning the particular times and channels on which the service will be broadcast and may also include information on the encapsulation protocol employed to encapsulate the transmission. If the service is encrypted, the subscription message may comprise information necessary to decrypt the transmission, as well. With this information, PC 30 is able to identify broadcast transmissions belonging to the service, strip off the encapsulation information, de-encrypt the transmissions (if necessary), and provide the content of the transmissions to the end-user, as described in more detail below.

Disabling of a particular service can be accomplished by including a timestamp in the subscription message instructing PCs 30 to delete the subscription message from their memories (or instructing PCs 30 not to use the information contained in the service parameter message), after a certain time period. Alternatively, the system may alter the channels and times for broadcast of particular services so that continued receipt of these services requires additional service parameter information not available to PCs that are to be disabled from receiving the service. In addition, if the service is encrypted, specific PCs 30 may be disabled by modifying the encryption and not transmitting an updated subscription message concerning the new encryption to the disabled PCs 30. A service may also be disabled on one or more particular PCs 30 by addressing a disable-service message for the service to the particular PCs 30 which are to be removed from the service.

As noted, subscription messages to enable/disable particular services may be addressed to specific PCs 30. In particular, each PC 30 may be assigned a unique address. Subscription messages comprising the addresses of particular PCs 30 are transmitted that instruct each addressed PC 30 to enable and/or disable particular services in the manner described above. The unique address is preferably implemented in hardware to avoid users configuring multiple PCs 30 to have the same address. When subscription manager 114 recognizes a subscription message addressed to its PC 30, it updates the subscription information in accordance with the contents of the received message.

Alternatively, instead of addressing subscription information to particular PCs 30, the system may regulate access to subscription information in other ways. For example, the subscription information may be encrypted or encapsulated before broadcast so that only PCs 30 with the proper decryption on deencapsulation information are able to receive the subscription information. Also, the subscription information may be broadcast at a specific time and on a specific channel known only to those PCs 30 that have subscribed to the service to which the subscription information pertains.

As noted above, in some embodiments end-users subscribe to services via a return connection to the content provider. In other preferred embodiments, end-users may subscribe to services in other ways. For example, an end-user may subscribe to a service by purchasing a disk or other storage medium comprising the necessary subscription information to receive the service.

This technique for distributing subscription information may be employed to link service-subscriptions to the sale of related (or other) items. Illustratively, a distributer of music CDs of a particular performer might package the CD together with a subscription to a live concert by the performer on a certain date in the future. To do so, the distributor would provide purchasers of the CD with appropriate subscription information to be loaded by the purchaser onto the purchaser's PC 30. The subscription information may be located on the CD itself or on another storage medium provided to the purchaser either at the time of sale or at a subsequent time. Alternatively, the subscription information may be broadcast to end-users who have purchased the performer's CD. As described above, the subscription information may, for example, comprise decryption software or other appropriate subscription information such as encapsulation information.

Thus, the present invention provides a system that is capable of enabling and disabling the receipt of particular services by end-users without requiring any return connection to the end-users. In other words, the present invention provides a transmission system that can employ unidirectional transmissions to limit receipt of particular portions of a transmission to specific end-users.

If the communication belongs to a subscribed service, subscription manager 114 then determines whether or not the end-user has enabled the service.

Assuming the service is both subscribed and enabled, subscription manager 114 next determines whether the received packet is part of a static media object such as a file or a dynamic media object such as a streaming data transmission. If the packet is part of a file, subscription manager 114 transmits the packet to file receiver 116. Similarly, if the packet is part of a streaming data transmission, subscription manager 114 transmits the packet to streaming data receiver 118.

File receiver 116 is connected to an I-cache proxy server 120 which manages an HTTP cache 122. In a preferred embodiment, HTTP cache 122 stores all received internet data. The user may then send a URL request to the file and gain access to its contents. Alternatively, the received information may be stored in a different memory and may be accessed using a browser.

HTTP cache 122 may be adapted to manage the incoming data in a large number of ways. Illustratively, cache 122 may be programmed to overwrite older data as new data is received, or may be programmed to cease storage of incoming information once the amount of information stored in cache 122 reaches a threshold.

Streaming data receiver 118 is connected to a real-time data interface 124 which manages play-out of the streaming data to an output port for display to the end-user of PC 30. In some circumstances, play-out may be via an additional interface, such as a DDE interface, Excel (TM), etc. Real-time data interface 124 is connected to a real-time database 126 which may temporarily store the received streaming data during play-out.

PC 30 may further be provided with several software tools, including an HTTP or web browser such as a media surfer (TM) 128 and internet explorer (TM) 130, to aid the end-user in navigating the received files and streaming data.

In a preferred embodiment, end-user PC 30 comprises a plurality of software programs running on a PC having, as minimum requirements, 16 Mb of RAM, 100 Mb of disk cache, and a 100 MHz Pentium (TM) processor. In addition, PC 30 preferably comprises an ISA card having a continuous data rate of approximately 1 Mbps and a PCI card having a continuous data rate of approximately 4 Mbps. Other system configurations may alternatively be employed.

Thus, as described above, the present invention provides a common interface for transmitting any type of media object via any broadcast environment. It thus permits the merging and transmission of a wide variety of both static and dynamic audio, video, and data objects in a manner that provides control over broadcast parameters and regulation of the end-users enabled to receive the transmitted material.

While the invention has been described in conjunction with specific embodiments, it is evident that numerous alternatives, modifications, and variations will be apparent to those skilled in the art in light of the foregoing description.

What is claimed is:

1. A system for broadcast transmission of media objects, comprising:
    (1) a channel management center, comprising:
        (a) a first scheduler, comprising:
            (i) a first processor;
            (ii) a first memory storing a first plurality of media objects, and
            (iii) a second memory storing first attribute data representative of broadcast attributes of the first plurality of media objects;
        (b) a first media-object retrieval manager having access to the stored first plurality of media objects and first broadcast-attribute data and adapted to coordinate loading of objects from the first plurality of media objects onto multiplex channels in accordance with the first broadcast-attribute data;
        (c) a first subscription database storing subscription information defining at least one broadcast service; and
        (d) means for modifying the one or more first media objects in accordance with the subscription information stored in the subscription database; and
    (2) a channel editing center, comprising:
        (a) a second scheduler, comprising:
            (i) a second processor;
            (ii) a third memory storing a second plurality of media objects, and
            (iii) a fourth memory storing second attribute data representative of broadcast attributes of the second plurality of media objects;
        (b) a second media-object retrieval manager having access to the stored second plurality of media objects and second broadcast-attribute data and adapted to coordinate loading of objects from the second plurality of media objects onto multiplex channels in accordance with the second broadcast-attribute data;
        (c) a second subscription database storing subscription information defining at least a second broadcast service;
        (d) means for modifying objects from the second plurality of media objects in accordance with the subscription information stored in the second subscription database; and
        (e) a multiplexer having a first input, a second input, and an output, wherein the first input of the multiplexer is adapted to receive a bitstream representative of objects from the first plurality of media objects and the second input of the multiplexer is adapted to receive a bitstream representative of objects from the second plurality of media objects, and the output of the multiplexer is transmitted to a broadcast facility.

2. The system of claim 1, wherein the play-out of the channel management center has a finite bandwidth, and wherein the broadcast scheduling for at least some of the finite bandwidth is performed by the first scheduler.

3. The system of claim 1, wherein the channel management center is located remote from the channel editing center.

4. The system of claim 1, wherein the channel editing center can be operated from a remote location.

5. The system of claim 1, wherein the data attribute database is located remote from the media object storage.

6. The system of claims 1, wherein the channel management center can be operated from a remote location.

7. The system of claim 2, therein the first scheduler further comprises a graphical user interface for graphically scheduling the broadcast of media objects.

8. The system of claim 7, wherein the graphical user interface permits a user to specify the time at which a media object is to be broadcast.

9. The system of claim 7, wherein the graphical user interface permits a user to specify the bandwidth via which the media object is to be broadcast.

10. The system of claim 1, further comprising:
    a media object tracking system, comprising:
        (a) an input desk for receiving media objects having different formats and assigning to each received media object one or more data attributes representative of the media object;
        (b) a tracking database comprising a plurality of records, each record storing the data attributes associated with a media object and further storing distribution, use, and modification information pertaining to the media object;
        (c) a media-object tracking tool adapted to track modification of media objects, and further adapted to update the tracking database in accordance with collected tracking information.

11. The system of claim 10, wherein the media-object tracking tool tracks modification of media objects by way of a tracking information collected from one of the first and second channel centers which is indicative of a modification of media objects.

12. A system for broadcast transmission of media objects, comprising:
    (1) a channel management center, comprising:
        (a) a first scheduler, comprising:
            (i) a first processor;
            (ii) a first memory storing a first plurality of media objects, and
            (iii) a second memory-storing first attribute data representative of broadcast attributes of the first plurality of media objects;
        (b) a first media-object retrieval manager having access to the stored first plurality of media objects and first broadcast-attribute data and adapted to coordinate loading of objects from the first plurality of media objects onto multiplex channels in accordance with the first broadcast-attribute data;
        (c) a first subscription database storing subscription information defining at least one broadcast service; and
        (d) means for modifying the one or more first media objects in accordance with the subscription information stored in the subscription database; and (2) a media object tracking system, comprising:
  (a) an input desk for receiving media objects having different formats and assigning to each received media object one or more data attributes representative of the media object;
  (b) a tracking database comprising a plurality of records, each record storing the data attributes associated with a media object and further storing distribution, use, and modification information pertaining to the media object;
  (c) a media-object tracking tool adapted to track the distribution, use and modification of media objects, and further adapted to update the tracking database in accordance with collected tracking information.

13. The system of claim 12, further comprising a channel editing station, the channel editing station being connected to both the input desk and the tracking database.

14. The system of claim 12, wherein one of the first and second channel centers is a channel management center and wherein the media-object tracking tool tracks modification of media objects by way of a tracking information collected from the channel management center which is indicative of a modification of media objects.

15. A system for broadcast transmission of media objects, comprising:
(1) a channel management center, comprising:
  (a) a first scheduler, comprising:
    (i) a first processor;
    (ii) a first memory storing a first plurality of media objects, and
    (iii) a second memory storing first broadcast-attribute data representative of broadcast attributes of the first plurality of media objects;
  (b) a first media-object retrieval manager having access to the stored first plurality of media objects and the first broadcast-attribute data;
  (c) a first file transfer manager coupled to the first media-object retrieval manager and the first scheduler, and adapted to receive one or more of the first plurality of media objects from the first scheduler in accordance with instructions issued by the first media-object retrieval manager;
  (d) a first subscription database storing subscription information defining at least one broadcast service; and
  (e) a first subscription control manager coupled to the first file transfer manager and the first subscription database and adapted to receive at least one of the first plurality of media objects from the first file transfer manager and to modify the received first media object in accordance with the subscription information stored in the first subscription database, the first subscription control manager having a first output and being adapted to provide the received media object as part of a bit stream in a predetermined digital format to the first output;
(2) a channel editing center, comprising:
  (a) a second scheduler, comprising:
    (i) a second processor;
    (ii) a third memory storing a second plurality of media objects, and
    (iii) a fourth memory storing second broadcast-attribute data representative of broadcast attributes of the second plurality of media objects;
  (b) a second media-object retrieval manager having access to the stored second plurality of media objects and the second broadcast-attribute data; and
  (c) a second file transfer manager coupled to the second media-object retrieval manager and the second scheduler, and adapted to receive at least one of the second plurality of media objects and its associated broadcast-attribute data from the second scheduler in accordance with instructions issued by the second media-object retrieval manager, the second file transfer manager having a second output and being adapted to provide the received media object and associated broadcast-attribute data to the second output,
    wherein the second output of the second file transfer manager is coupled to an input of the first scheduler, and wherein the first scheduler is adapted to receive the media object and store it in the first memory and to receive the associated broadcast-attribute data and to store it in the second memory.

16. A system for broadcasting media objects, comprising:
(1) a channel management center, comprising:
  (a) a first scheduler, comprising:
    (i) a first processor;
    (ii) a first memory storing a first plurality of media objects, and
    (iii) a second memory storing first broadcast-attribute data representative of broadcast attributes of the first plurality of media objects;
  (b) a first media-object retrieval manager having access to the stored first plurality of media objects and first broadcast-attribute data;
  (c) a first file transfer manager coupled to the media-object retrieval manager and the first scheduler and adapted to receive one or more of the first media objects from the first scheduler in accordance with instructions issued by the first media-object retrieval manager;
  (d) a first subscription database storing subscription information defining at least one broadcast service;
  (e) a first subscription control manager coupled to the first file transfer manager and the first subscription database and adapted to receive at least one of the first media objects from the first file transfer manager and to modify the received first media object in accordance with the subscription information stored in the first subscription database; and
  (f) a multiplexer having a first input, a second input, and a first output, wherein the first input of the multiplexer is coupled to an output of the first subscription control manager, and the first output of the multiplexer is transmitted to a broadcast facility;
(2) a channel editing center, comprising:
  (a) a second scheduler, comprising:
    (i) a second processor;
    (ii) a third memory storing a second plurality of media objects, and
    (iii) a fourth memory storing second broadcast-attribute data representative of broadcast attributes of the second plurality of media objects;
  (b) a second media-object retrieval manager having access to the stored second plurality of media objects and the second broadcast-attribute data;
  (c) a second file transfer manager coupled to the second media-object retrieval manager and the second scheduler and adapted to receive objects from the plurality of second media objects from the second scheduler in accordance with instructions issued by the second media-object retrieval manager;

(d) a second subscription database storing subscription information defining at least a second broadcast service; and (e) a second subscription control manager coupled to the second file transfer manager and the second subscription database and adapted to receive the one or more second media objects from the second file-transfer manager and to modify the received media objects in accordance with the subscription information stored in the second subscription database;

wherein the second subscription control manager has an output is coupled to the second input of the multiplexer.

17. The system of claim 16, wherein the second subscription control manager is coupled to the second input of the multiplexer via a third subscription control manager.

18. The system of claim 16, wherein the first and second subscription control managers are adapted to packetise the received media object and wherein the bit stream provided by the subscription control managers comprises digital data from a plurality of the resulting packets.

19. The system of claim 16, wherein each of the first and second subscription control managers is adapted to packetise at least two media objects, and is further adapted to interleave the resulting packets so that the first packet of the first media object is transmitted at practically the same time as the first packet of the second media object, and the last packet of the first media object is transmitted at practically the same time as the last packet of the second media object.

20. The system of claim 16, wherein the play-out of the channel management center has a finite bandwidth, and wherein the broadcast scheduling for at least some of the finite bandwidth is performed by the second scheduler.

21. The system of claim 16, wherein the channel management center is located remote from the channel editing center.

22. The system of claim 16, wherein the channel editing center can be operated from a remote location.

23. The system of claim 16, wherein the first scheduler further comprises a graphical user interface for graphically scheduling the broadcast of media objects.

24. A system for broadcasting media objects, comprising:

(1) a channel management center, comprising:

(a) a first scheduler, comprising:
 (i) a first processor;
 (ii) a first memory storing a first plurality of media objects, and
 (iii) a second memory storing first broadcast-attribute data representative of broadcast attributes of the first plurality of media objects;

(b) a first media-object retrieval manager having access to the stored first plurality of media objects and first broadcast-attribute data;

(c) a first file transfer manager coupled to the media-object retrieval manager and the first scheduler and adapted to receive one or more of the first media objects from the first scheduler in accordance with instructions issued by the first media-object retrieval manager;

(d) a first subscription database storing subscription information defining at least one broadcast service;

(e) a first subscription control manager coupled to the first file transfer manager and the first subscription database and adapted to receive at least one of the first media objects from the first file transfer manager and to modify the received first media object in accordance with the subscription information stored in the first subscription database; and (f) a multiplexer having a first input, a second input, and a first output, wherein the first input of the multiplexer is coupled to an output of the first subscription control manager, and the first output of the multiplexer is transmitted to a broadcast facility; and (2) a media object tracking system comprising:

(a) an input desk for receiving media objects having different formats and assigning to each received media object one or more data attributes representative of the media object;

(b) a tracking database comprising a plurality of records, each record storing the data attributes associated with a media object and further storing distribution, use, and modification information pertaining to the media object; and (c) a media-object tracking tool adapted to track the distribution, use and modification of media objects and further adapted to update the tracking database in accordance with collected tracking information.

25. The system of claim 24, further comprising a channel editing station, the channel editing station being connected to both the input desk and the tracking database.

26. A system for broadcast transmission of media objects which are scheduled at each of first and second channel centers, the first and second centers being remotely positioned relative to one another and in communication with each other, comprising;

at each of the first and second channel centers:

(a) a database of broadcast-attribute data representative of broadcast attributes of a plurality of media objects;

(b) a scheduler configured to schedule the broadcast transmission of the plurality of media objects using the broadcast-attribute data;

(c) a media-object retrieval manager adapted to coordinate loading of objects from the plurality of media objects onto multiplex channels in accordance with the broadcast-attribute data;

(d) a file transfer manager adapted to receive one or more of the media objects in accordance with instructions issued by the media object retrieval manager; and (e) a multiplexer having a first input, a second input, and an output, wherein the first input of the multiplexer is adapted to receive a bitstream representative of media objects from the file transfer manager of the first channel center and the second input of the multiplexer is adapted to receive a bitstream representative of media objects from the file transfer manager of the second channel center, and the output of the multiplexer multiplexes the bitstreams on its first and second inputs for transmission to a broadcast facility.

27. The system of claim 26, further comprising, at each of the first and second channel centers, a subscription database storing subscription information defining at least one broadcast service, and means for modifying the one or more media objects in accordance with the subscription information stored in the subscription database.

28. The system of claim 27, wherein the means for modifying are adapted to packetise the one or more media objects.

29. The system of claim 27, wherein the means for modifying each of the first and second channel centers is adapted to packetise at least two media objects, and is further adapted to interleave the resulting packets so that the first packet of the first media object is transmitted at practically the same time as the first packet of the second media object, and the last packet of the first media object is transmitted by the multiplexer to the broadcast facility at practically the same time as the last packet of the second media object.

30. The system of claim 26, wherein the database of broadcast-attribute data stores the bandwidth required to transmit a given media object among the plurality of media objects, the size of the given media object, and the name of the given media object.

31. The system of claim 26, wherein the play-out of each of the first and second channel centers has a finite bandwidth to use, and wherein the scheduler of each of the first and second channel centers schedules at least some of the finite bandwidth.

32. The system of claim 26, wherein each of the first and second channel centers can be operated from a remote location.

33. The system of claim 26, wherein at least one of the first and second schedulers further comprises a graphical user interface for graphically scheduling the broadcast of media objects.

34. the system of claim 33 wherein the graphical user interface permits a user to specify the bandwidth via which the media object is to be broadcast.

35. The system of claim 33, wherein the graphical user interface permits a user to specify the bandwidth via which the media object is to be broadcast.

36. The system of claim 26, wherein the multiplexer outputs the bitstreams in a predetermined digital format.

37. The system of claim 26, further comprising:

a media object tracking system, comprising:
- (a) an input desk for receiving media objects having different formats and assigning to each received media object one or more data attributes representative of the media object;
- (b) a tracking database comprising a plurality of records, each record storing the data attributes associated with a media object and further storing distribution, use, and modification information pertaining to the media object;
- (c) a media-object tracking tool adapted to track modification of media objects at least one of the first and second channel centers, and further adapted to update the tracking database in accordance with collected tracking information.

38. The system of claim 37, wherein the media object tracking tool tracks modification of media objects by way of a tracking information collected from one of the first and second channel centers which is indicative of a modification of media objects.

39. The system of claim 38 wherein each of the channel centers further comprise a database of the Broadcast Attribute data.

* * * * *